(12) United States Patent
Yasutomi et al.

(10) Patent No.: US 10,846,822 B2
(45) Date of Patent: Nov. 24, 2020

(54) IMAGE PROCESSING APPARATUS, IMAGE PICKUP APPARATUS, CONTROL METHOD OF IMAGE PROCESSING APPARATUS, AND RECORDING APPARATUS

(71) Applicant: CANON KABUSHIKI KAISHA, Tokyo (JP)

(72) Inventors: Takeshi Yasutomi, Hino (JP); Yoichi Takahashi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 16/034,975

(22) Filed: Jul. 13, 2018

(65) Prior Publication Data

US 2019/0026863 A1  Jan. 24, 2019

(30) Foreign Application Priority Data

Jul. 20, 2017  (JP) .................................. 2017-141305

(51) Int. Cl.
*G06T 3/40* (2006.01)
*H04N 5/232* (2006.01)
*H04N 5/262* (2006.01)
*H04N 19/513* (2014.01)
*G06T 7/223* (2017.01)
(Continued)

(52) U.S. Cl.
CPC ............ *G06T 3/4038* (2013.01); *G06T 7/223* (2017.01); *H04N 5/145* (2013.01); *H04N 5/2329* (2013.01); *H04N 5/23238* (2013.01); *H04N 5/23258* (2013.01); *H04N 5/23267* (2013.01); *H04N 5/2628* (2013.01); *H04N 19/513* (2014.11); *G06T 2207/10016* (2013.01); *H04N 19/527* (2014.11)

(58) Field of Classification Search
None
See application file for complete search history.

(56) References Cited

U.S. PATENT DOCUMENTS 7,777,781 B2 * 8/2010 Helbing ............. H04N 5/23254
                                                      348/139
8,300,015 B2 * 10/2012 Mellot .................. G06F 3/0317
                                                      345/156
(Continued)

FOREIGN PATENT DOCUMENTS

JP   H11-271831 A   10/1999
JP   2012-029138 A   2/2012
(Continued)

*Primary Examiner* — Iman K Kholdebarin
(74) *Attorney, Agent, or Firm* — Canon U.S.A., Inc. IP Division

(57) ABSTRACT

An image processing apparatus performs a first detection that detects motion information of an image sensor during a period in which the image sensor captures a first image and a second image based on an output of a sensor different from the image sensor, a second detection that detects a plurality of motion vectors between the first image and the second image, a determination of first reliability of the motion information detected by the first detection and second reliability of the motion vectors detected by the second detection, and an alignment based on either one of the motion vectors or a vector indicated by the motion information, which has higher reliability, or a vector obtained from the motion vectors and the motion information according to the reliability.

19 Claims, 13 Drawing Sheets

(51) Int. Cl.
*H04N 5/14* (2006.01)
*H04N 19/527* (2014.01)

(56) References Cited

U.S. PATENT DOCUMENTS

| | | | | |
|---|---|---|---|---|
| 2013/0182151 A1* | 7/2013 | Takagi | ................. | H04N 5/2621 |
| | | | | 348/240.99 |
| 2014/0152862 A1* | 6/2014 | Takagi | .................... | G06T 7/215 |
| | | | | 348/222.1 |

FOREIGN PATENT DOCUMENTS

| JP | 2012-220886 A | | 11/2012 |
|---|---|---|---|
| JP | 2014-519739 A | | 8/2014 |
| JP | 2017-055229 A | | 3/2017 |
| JP | 2017055229 A | * | 3/2017 |
| JP | 2017-103697 A | | 6/2017 |

\* cited by examiner

IMAGE PROCESSING APPARATUS, IMAGE PICKUP APPARATUS, CONTROL METHOD OF IMAGE PROCESSING APPARATUS, AND RECORDING APPARATUS

BACKGROUND OF THE INVENTION

Field of the Invention

The present invention relates to an image processing apparatus, and in particular to an image processing apparatus that performs alignment on a plurality of images.

Description of the Related Art

A technique of panoramic synthesis is known in which a plurality of images are captured while a digital camera or a mobile phone with a camera function is being moved and the plurality of captured images are connected together. In the panoramic synthesis, alignment of images is indispensable in order to acquire a synthetic image without a feeling of incompatibility.

PCT Japanese Translation Patent Publication No. 2014-519739 presents a method of performing alignment by using motion information of a digital camera detected by a gyro sensor or the like and a motion vector obtained from comparison of images. In a technique presented in PCT Japanese Translation Patent Publication No. 2014-519739, a motion vector used for the alignment of images is selected based on the motion information of the digital camera.

However, the reliability of the motion information of the digital camera detected by a sensor such as a gyro sensor may vary due to a plurality of factors such as an image pickup condition. Similarly, the reliability of the motion vector may vary. On the other hand, in the technique disclosed in PCT Japanese Translation Patent Publication No. 2014-519739, the motion vector is selected without considering the reliability of the motion information detected by a gyro sensor or the like, so that there is a possibility that a wrong motion vector is selected and the accuracy of the alignment is degraded.

SUMMARY OF THE INVENTION

The present disclosure is made in view of the above issue, and an object of the present disclosure is to obtain a more appropriate motion vector when performing alignment between images by using the motion information and the motion vector.

The present disclosure provides an image processing apparatus including a first detecting unit that detects motion information of an image sensor during a period in which the image sensor captures a first image and a second image based on an output of a sensor different from the image sensor, a second detecting unit that detects a plurality of motion vectors between the first image and the second image, a determination unit that performs determination of first reliability of the motion information detected by the first detecting unit and second reliability of the motion vectors detected by the second detecting unit, and an alignment unit that performs alignment on the first image and the second image based on either one of the motion vectors or a vector indicated by the motion information, which has higher reliability, or a vector obtained from the motion vectors and the motion information according to the reliability.

Further features of the present disclosure will become apparent from the following description of exemplary embodiments (with reference to the attached drawings).

DESCRIPTION OF THE EMBODIMENTS

Hereinafter, a preferred embodiment of the present disclosure will be described in detail with reference to the accompanying drawings.

Figure 1:
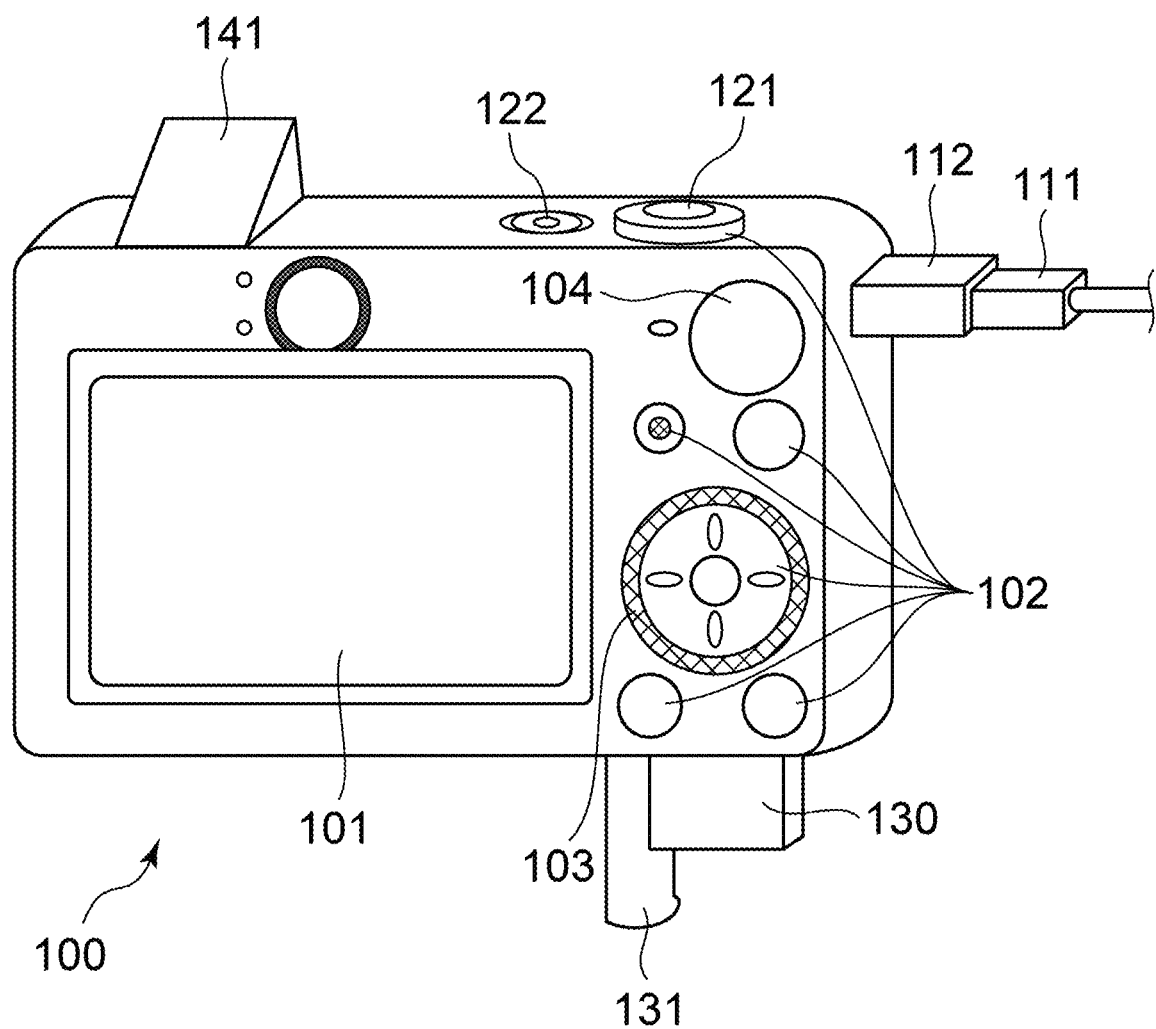
FIG. 1 is a rear perspective view showing a schematic configuration of a digital camera according to an embodiment of the present disclosure.

FIG. 1 is a rear perspective view showing a schematic configuration of a digital camera according to an embodiment of the present disclosure.

A rear surface of the digital camera 100 is provided with a display unit 101 that displays an image and various information and an operation unit 102 composed of operation members such as various switches and buttons that receive various operations by a user. Further, the rear surface of the digital camera 100 is provided with a mode switching switch 104 that switches an image pickup mode and the like and a controller wheel 103 that can be rotationally operated. An upper surface of the digital camera 100 is provided with a shutter button 121 that issues an image pickup instruction, a power supply switch 122 that switches ON/OFF of power supply of the digital camera 100, and a stroboscope 141 that emits flashlight to a subject.

The digital camera 100 can be connected with an external apparatus through a connection cable 111 and a connector 112 and can output image data (still image data and/or moving image data) and the like to the external apparatus. A lower surface of the digital camera 100 is provided with a storage medium slot (not shown in the drawings) that can be opened and closed by a lid 131, and a storage medium 130 such as a memory card can be inserted into and removed from the storage medium slot.

The storage medium 130 stored in the storage medium slot can communicate with a system control unit 210 (see FIG. 2) of the digital camera 100. The storage medium 130 is not limited to a memory card and the like that can be inserted into and removed from the storage medium slot, but may be an optical disk or a magnetic disk such as a hard disk and further may be built in a main body of the digital camera 100.

Figure 2:
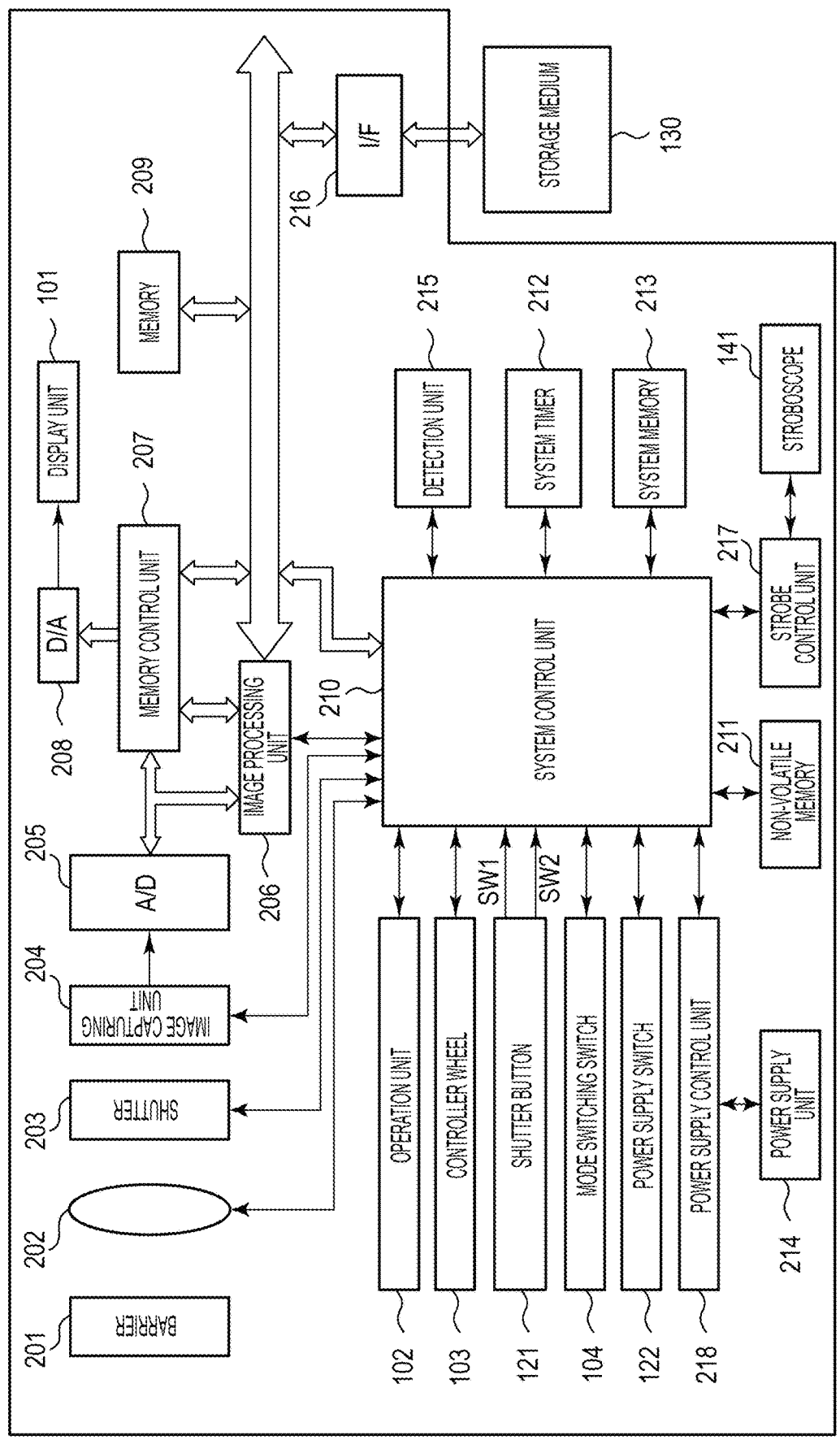
FIG. 2 is a block diagram showing a hardware configuration of the digital camera according to the embodiment of the present disclosure.

FIG. 2 is a block diagram showing a hardware configuration of the digital camera 100. The digital camera 100 includes a barrier 201, an image pickup lens 202, a shutter 203, and an image pickup unit 204. The barrier 201 covers an image pickup optical system, so that the barrier 201 prevents the image pickup optical system from being contaminated or damaged. The image pickup lens 202 is formed of a lens group including a zoom lens and a focus lens and forms the image pickup optical system. The shutter 203 has an aperture function and adjusts an exposure amount on the image pickup unit 204. The image pickup unit 204 is an image pickup element that converts an optical image into an electrical signal (analog signal). For example, the image pickup unit 204 is an image sensor such as a CCD sensor and a CMOS sensor which have a Bayer array structure where RGB pixels are regularly arranged. The shutter 203 may be a mechanical type shutter (hereinafter referred to as a mechanical shutter) or may be an electronical shutter that controls an accumulation time by controlling a reset timing of the image pickup element.

When the image pickup unit 204 has a structure where a plurality of photoelectric conversion units are provided for each pixel and a stereo image can be acquired, auto-focusing (AF) processing described later can be more quickly performed.

The digital camera 100 includes an A/D converter 205, an image processing unit 206, a memory control unit 207, a D/A converter 208, a memory 209, and a system control unit 210. An analog signal is outputted from the image pickup unit 204 to the A/D converter 205, and the A/D converter 205 converts the acquired analog signal into image data formed of a digital signal and outputs the image data to the image processing unit 206 or the memory control unit 207.

The image processing unit 206 performs correction processing such as pixel interpolation and shading correction, white balance processing, gamma correction processing, color conversion processing, and the like on image data acquired from the A/D converter 205 or data acquired from the memory control unit 207. Further, the image processing unit 206 realizes an electronic zoom function by performing a cutout of an image and variable magnification processing. Furthermore, the image processing unit 206 performs predetermined calculation processing by using image data of a captured image and the system control unit 210 performs exposure control and range finding control based on a calculation result obtained by the calculation processing. For example, the system control unit 210 performs AF (Automatic Focus) processing of TTL (Through-The-Lens) system, AE (Automatic Exposure) processing, and EF (strobo-scopic pre-flash) processing. The image processing unit 206 performs predetermined calculation processing by using image data of a captured image and the system control unit 210 performs AWB (Automatic White Balance) processing of TTL system by using an obtained calculation result.

The image processing unit 206 synthesizes a panoramic image from a plurality of images and has an image synthesis processing circuit that determines a result of the synthesis. The image synthesis processing circuit can perform not only a simple average synthesis but also processing of a lightning synthesis or a darkening synthesis where one image data is generated by selecting a pixel that has a brightest value or a darkest value in each area of image data to be synthesized. Further, the image synthesis processing circuit evaluates and determines a synthesis result based on a specific criterion. For example, when the number of synthesized images does not satisfy a predetermined number or when a length of a synthesized image does not satisfy a reference value, the image synthesis processing circuit determines that the synthesis fails. Instead of the image processing unit 206, software processing by the system control unit 210 may realize the function of the image synthesis processing.

The image data outputted from the A/D converter 205 is written to the memory 209 through the image processing unit 206 and the memory control unit 207 or through the memory control unit 207. The memory 209 doubles as an image display memory (video memory) that stores image data to be displayed on the display unit 101. The memory 209 has a storage capacity which can store a predetermined number of still images, a panoramic image (wide angle image), and a panoramic image synthesis result. The memory 209 can also be used as a work area where the system control unit 210 unfolds a program and the like read from a non-volatile memory 211.

Image display data (digital data) stored in the memory 209 is transmitted to the D/A converter 208. The D/A converter 208 converts the received digital data into an analog signal and supplies the analog signal to the display unit 101, and thereby an image is displayed on the display unit 101. The display unit 101 is a display apparatus such as a liquid crystal display or an organic EL display and displays an image based on the analog signal from the D/A converter 208. On/off of the image display on the display unit 101 is switched by the system control unit 210, and it is possible to reduce power consumption by turning off the image display. It is possible to realize an electronic viewfinder function that displays a live view by converting the digital signal accumulated in the memory 209 from the image pickup unit 204 through the A/D converter 205 into an analog signal by the D/A converter 208 and sequentially displaying the analog signal on the display unit 101.

The digital camera 100 includes a non-volatile memory 211, a system timer 212, a system memory 213, a detection unit 215, and a strobe control unit 217. The non-volatile memory 211 is an electrically erasable and storable memory (for example, an EEPROM or the like) and stores a program to be executed by the system control unit 210 and operation constants and the like. The non-volatile memory 211 has an area where system information is stored and an area where user setting information is stored. The system control unit 210 reads various information and settings stored in the non-volatile memory 211 and restores the various information and settings when the digital camera 100 is started up.

The system control unit 210 includes a CPU and controls an overall operation of the digital camera 100 by executing various program codes stored in the non-volatile memory 211. The program, operation constants, variables, and the like which are read from the non-volatile memory 211 by the system control unit 210 are unfolded on the system memory 213. A RAM is used as the system memory 213. Further, the system control unit 210 performs display control by controlling the memory 209, the D/A converter 208, the display unit 101, and the like. The system timer 212 measures a time used for various controls and a time of a built-in clock. The strobe control unit 217 controls light emission of the stroboscope 141 according to the brightness of the subject. The detection unit 215 includes a gyroscope and a sensor and acquires angular velocity information and posture information of the digital camera 100. The angular velocity information includes information of an angular velocity and an angular acceleration when the digital camera 100 performs panoramic image pickup. The posture information includes an inclination of the digital camera 100 with respect to the horizontal direction.

The display unit 101, the operation unit 102, the controller wheel 103, the shutter button 121, the mode switching switch 104, the power supply switch 122, the stroboscope 141, which are shown in FIG. 2, are the same as those described with reference to FIG. 1.

For example, various operation members constituting the operation unit 102 are used to select various function icons displayed on the display unit 101. When a predetermined icon is selected, a function is assigned for each scene. In other words, each operation member of the operation unit 102 functions as a kind of function button. Examples of the function button include an end button, a return button, an image feed button, a jump button, a narrowing down button, an attribute change button, and a DISP button. For example, when a menu button in pressed, a menu screen for performing various settings is displayed on the display unit 101. A user can intuitively perform a setting operation by using the menu screen displayed on the display unit 101, four direction buttons of up, down, right, and left, and a SET button.

The controller wheel 103, which is an operation member that can be rotationally operated, is used along with the four direction buttons when specifying a selection item. When the controller wheel 103 is rotationally operated, an electrical pulse signal is generated according to an operation amount (rotation angle, number of rotations, and the like). The system control unit 210 controls each unit of the digital camera 100 by analyzing the pulse signal.

The shutter button 121 has a first switch SW1 and a second switch SW2. The first switch SW1 is turned ON in a half-stroke state during an operation of the shutter button 121, and thereby a signal to instruct preparation for image pickup is transmitted to the system control unit 210. When the system control unit 210 receives a signal indicating that the first switch SW1 turns ON, the system control unit 210 starts operations such as the AF processing, the AE processing, the AWB processing, the EF processing, and the like. The second switch SW2 is turned ON in a full stroke state when the operation of the shutter button 121 is completed, and thereby a signal to instruct start of image pickup is transmitted to the system control unit 210. When the system control unit 210 receives a signal indicating that the second switch SW2 turns ON, the system control unit 210 performs a series of image pickup operations from reading a signal from the image pickup unit 204 to writing image data to the storage medium 130.

The mode switching switch 104 is a switch for switching an operation mode of the digital camera 100 between various modes such as a still image pickup mode, a moving image pickup mode, and a reproduction mode. The still image pickup mode includes a panoramic image pickup mode that synthesizes a panoramic image by panoramic image pickup in addition to an automatic image pickup mode.

The digital camera 100 includes a power supply unit 214 and a power supply control unit 218. The power supply unit 214 is a primary battery such as an alkaline battery or a lithium battery, a secondary battery such as a NiCd battery, a NiMH battery, or a Li battery, or an AC adapter, and supplies electric power to the power supply control unit 218. The power supply control unit 218 detects the presence or absence of a battery mounted on the power supply unit 214, the type of battery, a battery remaining quantity, and the like, and supplies a necessary voltage to each unit including the storage medium 130 for a necessary period based on the detection result and an instruction from the system control unit 210.

The digital camera 100 includes a storage medium I/F 216 for enabling communication between the storage medium 130 and the system control unit 210 when the storage medium 130 is inserted into a storage medium slot (not shown in the drawings). The details of the storage medium 130 have already been described with reference to FIG. 1, so that description is omitted herein.

Next, a method of the panoramic image pickup and a method of synthesizing a panoramic image from a plurality of captured images will be described. First, processing of cutting out a predetermined area from image data of a captured image in order to synthesize a panoramic image will be described.

FIGS. 3A to 3D are diagrams for explaining a relationship between a direction in which the digital camera 100 moves and a cutout area of image data during the panoramic image pickup.

Figure 3A:
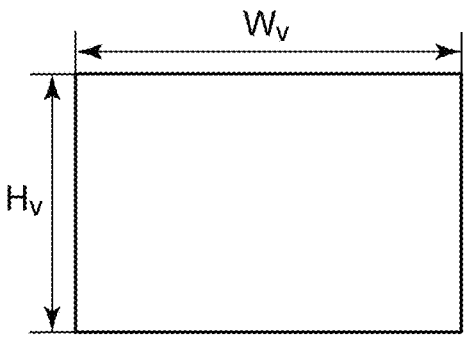
FIGS. 3A to 3D are diagrams for explaining a relationship between a direction in which the digital camera moves and a cutout area of image data during panoramic image pickup according to the embodiment of the present disclosure.
Figure 3B:
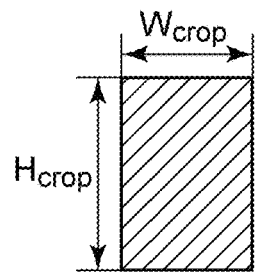

FIG. 3A shows an effective image area of the image pickup element included in the image pickup unit 204. "Wv" is the number of effective pixels in a horizontal direction, and "Hv" is the number of effective pixels in a vertical direction. FIG. 3B shows a cutout area that is cut out from the image data of the captured image. "Wcrop" is the number of pixels that are cut out in the horizontal direction, and "Hcrop" is the number of pixels that are cut out in the vertical direction.

Figure 3C:
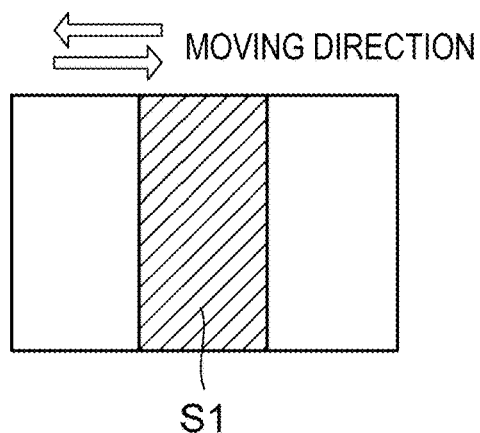

FIG. 3C is a diagram showing a cutout area with respect to the image data when performing the panoramic image pickup while moving the digital camera 100 in the horizontal direction indicated by arrows. In FIG. 3C, a hatched area S1 indicates a cutout area that is cut out from the image data and satisfies the following formulas (Formula 1) and (Formula 2).

$$Wv > Wcrop \quad \text{(Formula 1)}$$

$$Hv = Hcrop \quad \text{(Formula 2)}$$

Figure 3D:
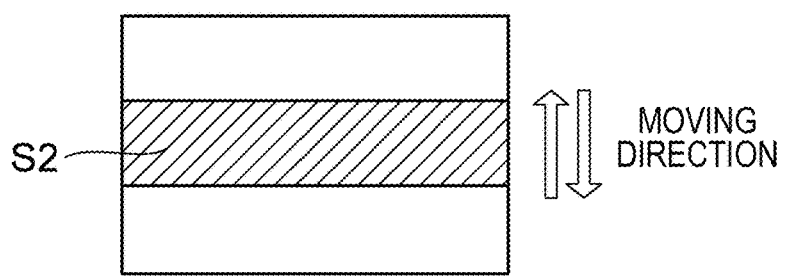

Similarly, FIG. 3D is a diagram showing a cutout area with respect to the image data when performing the panoramic image pickup while moving the digital camera 100 in the vertical direction indicated by arrows. In FIG. 3D, a hatched area S2 indicates a cutout area that is cut out from the image data and satisfies the following formulas (Formula 3) and (Formula 4).

$$Wv = Wcrop \quad \text{(Formula 3)}$$

$$Hv > Hcrop \quad \text{(Formula 4)}$$

The cutout area that is cut out from the image data of the captured image may be different for each image data. Regarding image data when the panoramic image pickup is started and image data when the panoramic image pickup is completed, the cutout area may be large in order to increase a view angle. A determination method of the cutout area that is cut out from the image data can be determined by, for example, a difference between an angle of the digital camera 100 immediately after the image pickup and an angle of the digital camera 100 one frame before. It is possible to save a storage capacity of the memory 209 by cutting out and storing only image data necessary for the synthesis processing of the panoramic image.

It is preferable to arrange the cutout area at the center of the captured image as much as possible. This is because strain is generally low at the center of the captured image and therefore it is possible to generate a more natural synthetic image when arranging the cutout area at the center of the image.

Next, a synthesis method of a panoramic image will be described. The system control unit 210 reads a cutout area, which is stored when the panoramic image pickup is performed, from the memory 209 and performs panoramic synthesis on the read image data.

Figure 4A:
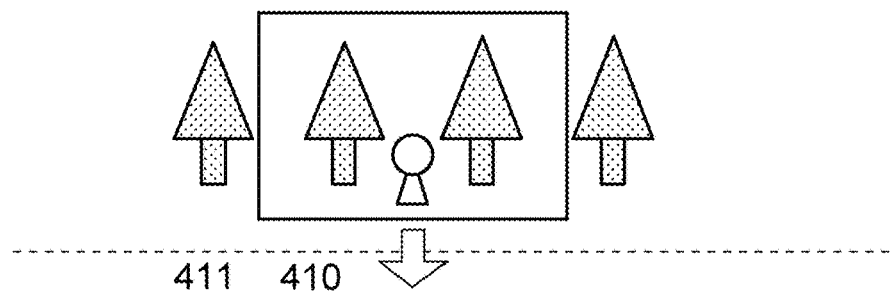
FIGS. 4A to 4F are diagrams for explaining a flow of synthesis processing of a panoramic image according to the embodiment of the present disclosure.
Figure 4B:
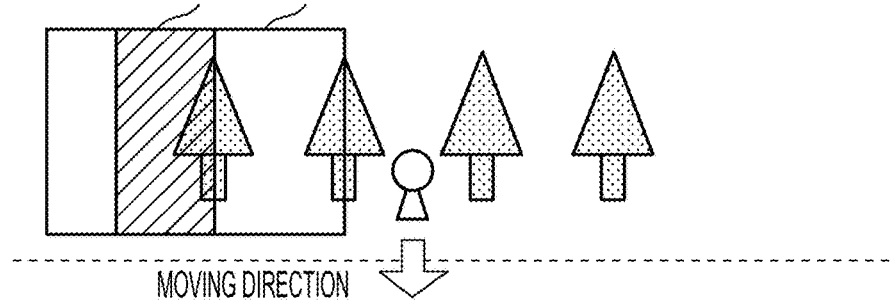
Figure 4C:
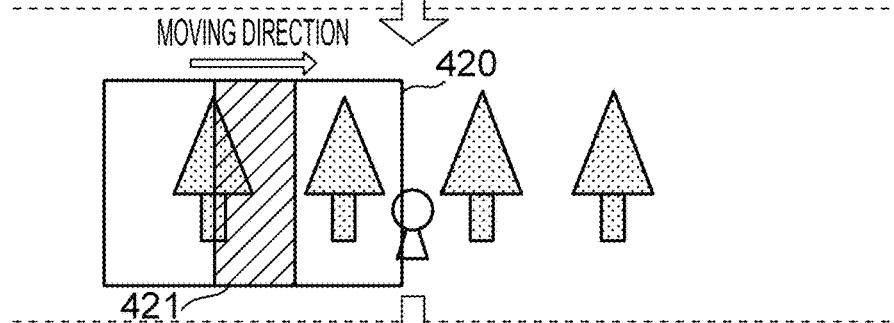
Figure 4D:
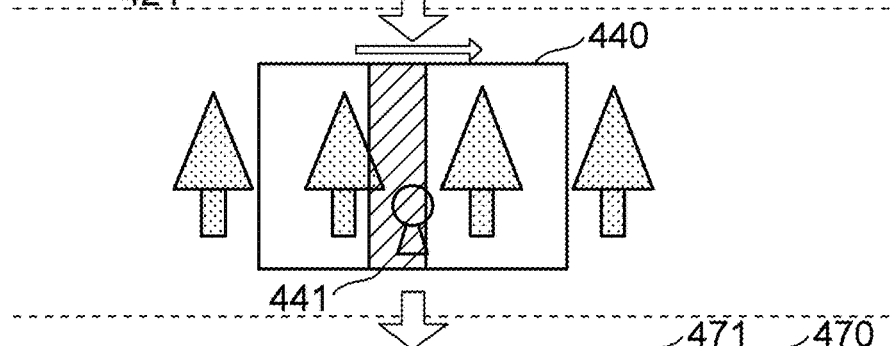
Figure 4E:
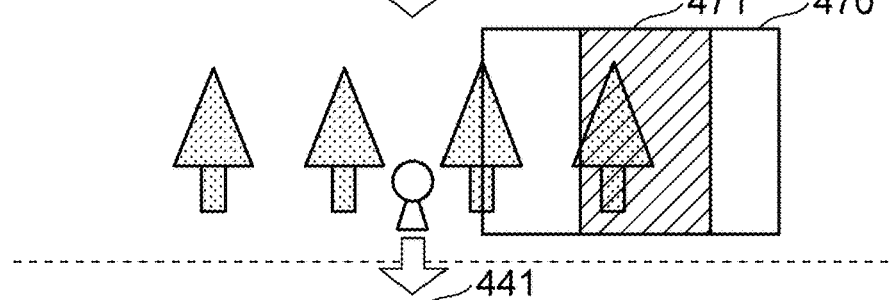

FIGS. 4A to 4F are diagrams for explaining a flow of the synthesis processing of the panoramic image. In FIGS. 4A to 4F, a dot-hatched area is an area where one of trees in an image sensing field is schematically represented, and an obliquely hatched area represents a cutout area of image data. FIG. 4A shows a state where a user presses the shutter button 121 and the first switch SW1 is turned on and shows that the user performs focus adjustment on a main subject. FIG. 4B shows a position where the second switch SW2 of the shutter button 121 is turned ON, and the user sets a view angle from one end of a panoramic image to be synthesized. In FIG. 4B, the image pickup unit 204 captures an image 410. FIGS. 4C to 4E schematically show a state where the user performs the panoramic image pickup while moving the digital camera 100 toward the other end of the panoramic image to be synthesized. FIG. 4E shows a state where the user stops pressing the shutter button 121 and the panoramic image pickup is completed. In FIGS. 4B to 4E, the image pickup unit 204 captures a total of seven images 410 to 470. However, the images 430, 450, and 460 are not shown in the drawings. The image processing unit 206 performs cutout processing on the images 410 to 470 captured by the image pickup unit 204 and generates cutout areas 411 to 471. In the system control unit 210, while the width of the cutout area may be determined in advance, the width may be changed in accordance with the moving velocity of the digital camera 100 that is performing the panoramic image pickup.

Figure 4F:
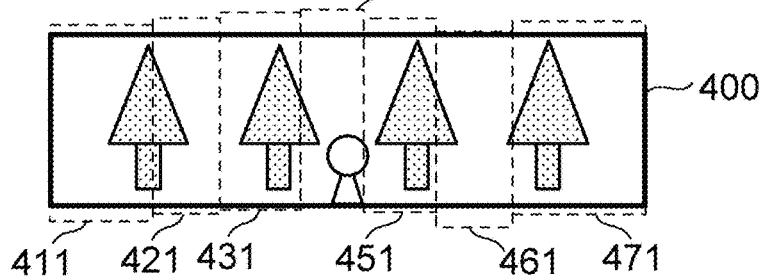

FIG. 4F shows a panoramic image formed by the image processing unit 206 synthesizing a plurality of images captured by the image pickup unit 204. Here, the system control unit 210 performs alignment on the images before performing synthesis. Further, upper sides and lower sides of the cutout areas 411 to 471 are not aligned due to camera shake or the like, so that the image processing unit 206 performs the cutout processing also in the vertical direction. As a result, the image processing unit 206 generates the panoramic image as shown by an area 400.

The system control unit 210 performs alignment based on a plurality of motion vectors detected by the image processing unit 206. As an example, the image processing unit 206 divides a cutout area into small blocks of an arbitrary size and calculates a corresponding point where a sum of absolute difference (herein after referred to as SAD) of luminance becomes minimum for each small block. The system control unit 210 can calculate a motion vector from the calculated corresponding point where the SAD becomes minimum. Besides the SAD, the system control unit 210 may use the sum of squared difference (herein after referred to as SSD), the normalized cross correlation (herein after referred to as NCC), or the like.

For ease of explanation, FIGS. 4A to 4F show an example in which the cutout areas 411 to 471 do not superimpose each other and are adjacent to each other. If there is an area where the cutout areas superimpose each other, the image processing unit 206 defines the center of the superimposed area as a boundary and outputs image information of one cutout area on the left side of the boundary and image information of the other cutout area on the right side of the boundary to the synthetic image. Alternatively, the image processing unit 206 performs synthesis while outputting values, where 50% of image information of the one cutout area and 50% of image information of the other cutout area are synthesized, on the boundary, and as the distance from the boundary increases, increasing a ratio of the one cutout area on the left side of the boundary and increasing a ratio of the other cutout area on the right side of the boundary.

In the present embodiment, different from conventional alignment, the plurality of motion vectors detected by the image processing unit 206 are selected by using not only the angular velocity information detected by the detection unit 215 but also the reliability of the angular velocity information and the like. Hereinafter, a flow of the present embodiment will be described with reference to a flowchart.

Figure 5:
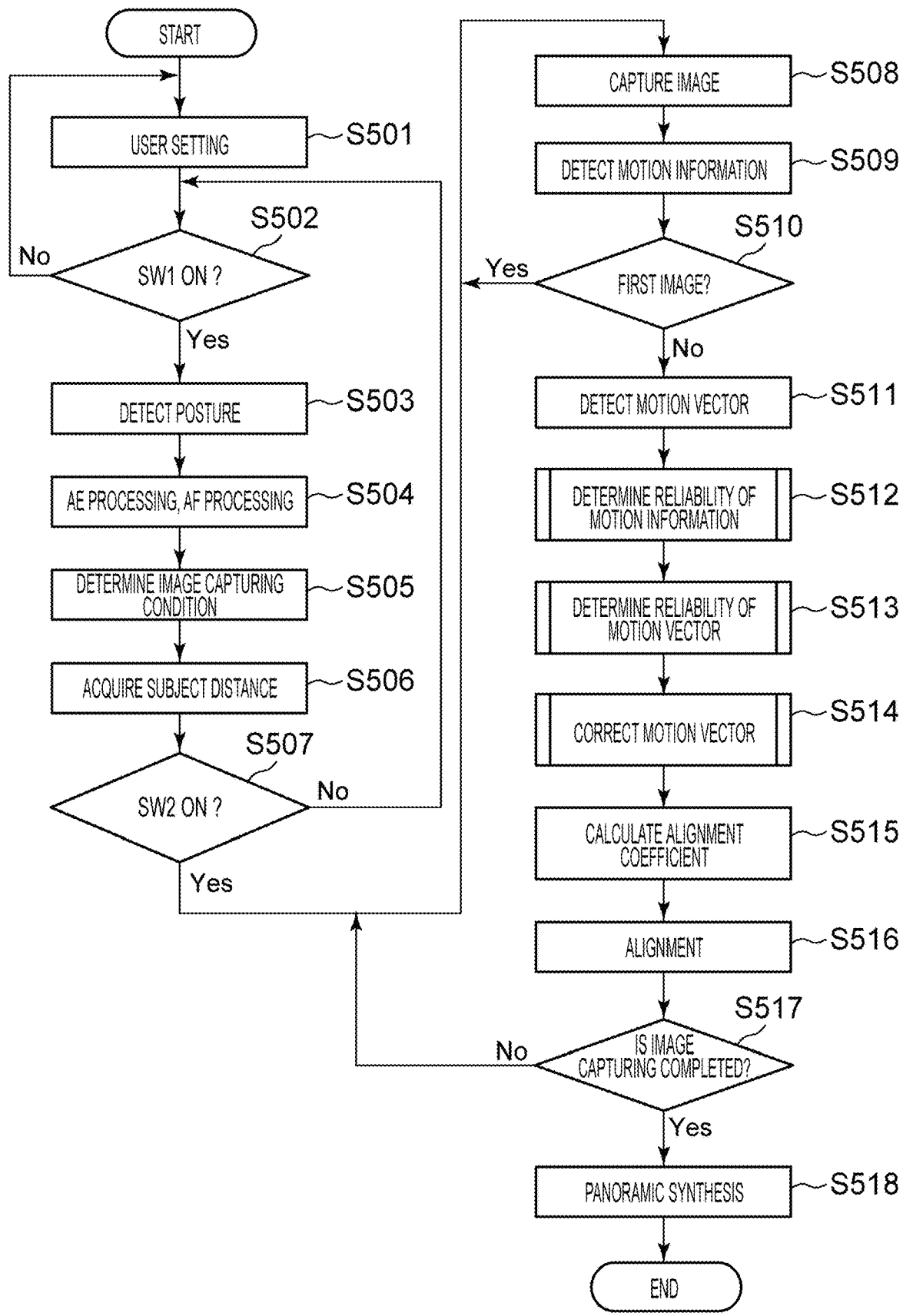
FIG. 5 is a flowchart for explaining the embodiment of the present disclosure.

FIG. 5 is a flowchart for explaining the present embodiment. When a user selects a panoramic image synthesis mode by the mode switching switch 104, the digital camera 100 performs processing of FIG. 5.

In step S501, the user performs setting for the panoramic image pickup. For example, the user performs setting of a view angle and an image pickup direction of a panoramic synthesis image. If the user does not perform setting in step S501, in the panoramic image pickup, the digital camera 100 uses an initial setting or a setting used in the previous panoramic image pickup.

Subsequently, in step S502, the system control unit 210 determines whether or not the first switch SW1 is pressed, and when determining that the first switch SW1 is pressed, the system control unit 210 proceeds to processing of step S503. When determining that the first switch SW1 is not pressed, the system control unit 210 returns to processing of step S501.

In step S503, the detection unit 215 performs posture detection processing. In the posture detection processing, the detection unit 215 determines an orientation of the digital camera 100. If the user sets the orientation of the digital camera 100 in advance in the setting in step S501, the system control unit 210 compares here the set orientation of the digital camera 100 with an actual orientation, and when the set orientation is different from the actual orientation, the system control unit 210 issues an appropriate warning.

In step S504, the digital camera 100 performs automatic exposure processing control (AE) processing and automatic focus detection (AF) processing.

In step S505, the system control unit 210 determines image pickup conditions such as image pickup sensitivity based on an AE processing result in step S504.

In step S506, the digital camera 100 detects a subject distance. The system control unit 210 obtains the subject distance from a focal point distance of the image pickup unit 204 when it is determined that the subject is in a focused condition in the AF processing in step S504.

Next, in step S507, the system control unit 210 determines whether or not the second switch SW2 is pressed. When determining that the second switch SW2 is not pressed in step S507, the system control unit 210 returns to step S502 and determines whether or not the first switch SW1 is still pressed (whether or not the first switch SW1 is still in the half-stroke state). When determining that the second switch SW2 is pressed in step S507, the system control unit 210 advances to step S508 and the image pickup unit 204 performs image pickup in an image pickup condition determined in step S505.

In step S509, the detection unit 215 detects motion information such as an angular velocity. Here, information of the angular velocity obtained from the detection unit 215 is not stable and may be outputted in a state where an offset is added, so that a bypass filter may be used and a value from which the offset is removed may be used. The motion information detected by the detection unit 215 is used to calculate an alignment coefficient in step S514 described later.

In step S510, the system control unit 210 determines whether or not the image captured by the image pickup unit 204 in step S508 is a first image. When the image captured by the image pickup unit 204 in step S508 is the first image, there is only the first image in the memory 209, so that the image processing unit 206 cannot perform alignment. Therefore, when the system control unit 210 determines that the image is the first image in step S510, the system control unit 210 returns the flow to step S508. On the other hand, when the system control unit 210 determines that the image is not the first image in step S510, the system control unit 210 advances to step S511.

In step S511, the system control unit 210 detects a motion vector. The image processing unit 206 sets a plurality of small blocks in one of two images. It is preferable that each of the small blocks has the same size. Further, the image processing unit 206 may set the small blocks in a part of the image instead of in the entire image. The system control unit 210 selects one of the plurality of small blocks set in the one of the two images, and in the other image, the system control unit 210 sets a search block that is located in the same position as that of the selected small block and is larger than the small block. The system control unit 210 extracts an area, of which correlational relationship with the selected small block in the one image is the highest (value of SAD from that of the selected small block is the smallest), from the search block in the other image. The system control unit 210 can extract a motion vector corresponding to the small block from the coordinates of a corresponding point which is the center of the extracted area and the coordinates of the center position of the selected small block. The system control unit 210 performs the above operation on all the small blocks and calculates motion vectors corresponding to all the small blocks.

In step S512, the system control unit 210 determines reliability of the motion information. Details will be described later.

In step S513, the system control unit 210 determines reliability of the motion vector. Details will be described later.

In step S514, the system control unit 210 performs correction on the motion vector. Details will be described later.

In step S515, the system control unit 210 calculates an alignment coefficient by using the motion vector that has been corrected. When only a translation movement is used, the system control unit 210 can use a mean value of the motion vectors that have been corrected. Alternatively, the system control unit 210 counts the number of motion vectors indicating the same direction from among the motion vectors that have been corrected and uses motion vectors, the number of which is the largest. When processing of scaling and/or rotation is required to be performed on an image, the system control unit 210 uses, for example, a projective transformation coefficient as the alignment coefficient. However, the alignment coefficient is not limited to the projective transformation coefficient. An affine transformation coefficient and a simplified alignment coefficient of only horizontal/vertical shift may also be used.

In step S516, the system control unit 210 performs alignment. For example, the system control unit 210 can perform alignment by using the formula shown by (Formula 5).

[Expression 1]

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{Formula (5)}$$

In (Formula 5), (x', y') represents coordinates after the alignment is performed, and (x, y) represents coordinates before the alignment is performed. A matrix A represents the alignment coefficient calculated by the system control unit 210 in step S515.

In step S517, the system control unit 210 determines whether or not the image pickup is being continued, and when the image pickup is being continued, the system control unit 210 returns the processing to step S508. On the other hand, when the system control unit 210 determines that the image pickup is completed, the system control unit 210 proceeds to step S518. The system control unit 210 determines whether the image pickup is being continued or is completed based on the user setting in step S501. For example, when the view angle set in step S501 is reached, the system control unit 210 determines that the image pickup is completed.

In step S518, the image processing unit 206 performs panoramic synthesis. First, the image processing unit 206 cuts out a rectangular area near the center where the strain is small from each image. Next, the image processing unit 206 performs synthesis processing on the area cut out from each image. Details of the synthesis processing are the same as the description of FIGS. 4A to 4F described above, so that the details are omitted here.

<Determination of Reliability of Motion Information and Reliability of Motion Vector>

Next, the determination of the reliability of the motion information in step S512 described above and the determination of the reliability of the motion vector in step S513 described above will be described.

As described above, the system control unit 210 detects the motion vector by performing comparison between images in step S511. However, some motion vectors may be falsely detected due to images. For example, there is a high possibility that a motion vector is falsely detected in a landscape such as a sky and a lawn where a similar pattern continues and in a landscape such as a wave and a waterfall where a pattern changes at all times. To solve the above problem, in the present embodiment, the system control unit 210 performs correction on a motion vector to be highly probably falsely detected by using the motion information detected by the detection unit 215.

However, the motion information detected by the detection unit 215 in step S509 is not necessarily correct at all times and may include a large error. If the system control unit 210 performs correction on a motion vector by using incorrect motion information, the system control unit 210 may undesirably degrade the accuracy of the alignment.

Therefore, in the present embodiment, the system control unit 210 determines the reliability of the motion information and the reliability of the motion vector, and performs correction on the motion vector by referring to the reliabilities.

The reliability of the motion information is decided by the nature of the detection unit 215 and may be changed by receiving various effects during image pickup. When the system control unit 210 detects a case where the reliability is affected, the system control unit 210 adjusts the reliability.

Figure 6A:
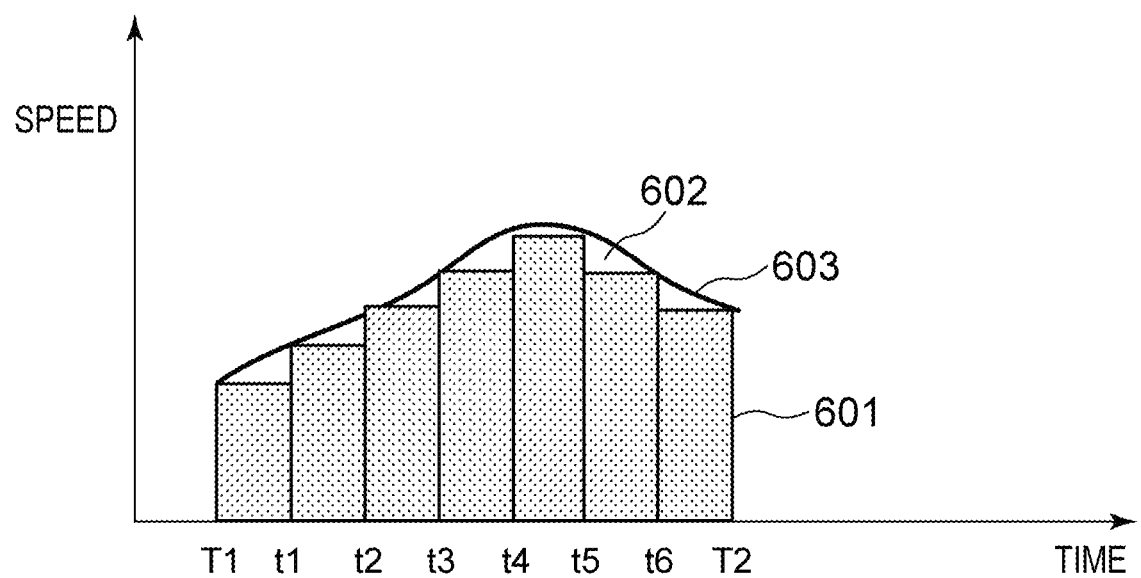
FIGS. 6A and 6B are diagrams for explaining an error of motion information detected by a detection unit in the embodiment of the present disclosure.
Figure 6B:
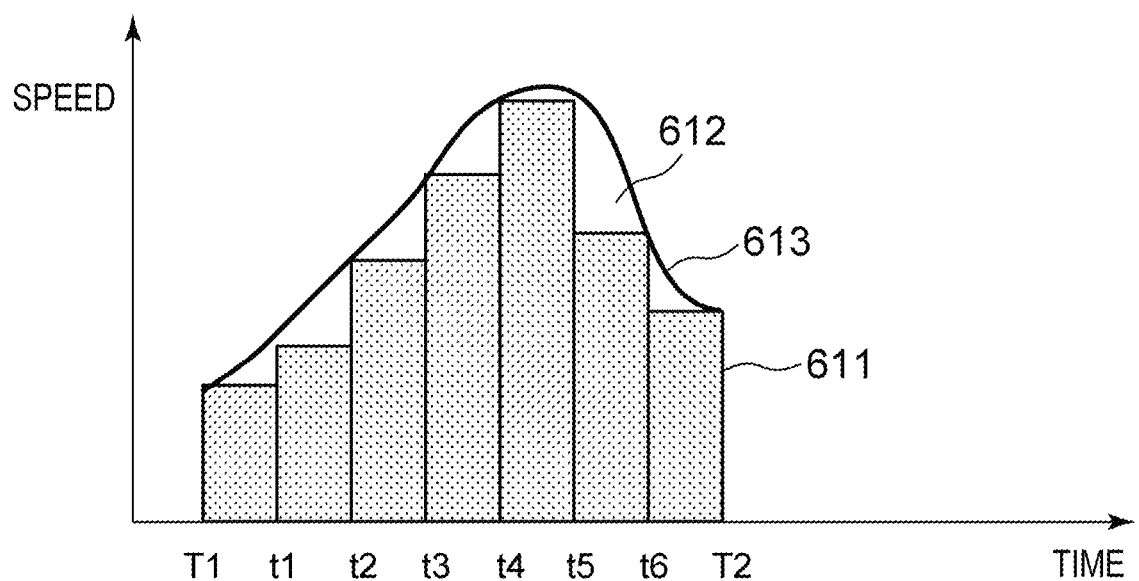

FIGS. 6A and 6B are diagrams for explaining an error of the motion information detected by the detection unit 215 in the present embodiment. To simplify the description, it is assumed that the image pickup unit 204 moves in a single direction and the system control unit 210 obtains the speed of the motion of the image pickup unit 204 based on the angular velocity detected by the detection unit 215. The image pickup unit 204 completes an exposure for capturing a previous image at time T1, and starts an exposure for capturing a next image at time T2. The detection unit 215 obtains the speed of the image pickup unit 204 at equal interval six times (t1 to t6) between time T1 and time T2. The system control unit 210 obtains an area of a vertical bar 601 in FIG. 6A as motion information. Similarly, the system control unit 210 obtains an area of a vertical bar 611 in FIG. 6B as motion information. However, in FIGS. 6A and 6B, a curved line 603 and a curved line 613 indicate the speed of the actual continuous motion of the image pickup unit 204, and blank portions 602 and 612 mean a detection error of the detection unit 215. When comparing FIG. 6A and FIG. 6B, it is known that an area of the blank portion 612 that means an error is large in FIG. 6B where dispersion is large. As described above, when the dispersion of the velocity obtained from the detection result of the detection unit 215 is large, there is a possibility that the error of the motion information is large.

Another example of the change of the error of the motion information is an effect of an operation of the shutter 203 when the shutter 203 is a mechanical shutter. When the shutter 203, which is a mechanical shutter, operates, the digital camera 100 vibrates, so that there is a possibility that a detection accuracy of a gyro sensor provided in the detection unit 215 is affected. However, such an effect occurs mainly in a direction in which the mechanical shutter operates, and the effect is small in a direction perpendicular to the direction in which the mechanical shutter operates.

Another factor that affects the error of the motion information is a timing immediately after the start-up of the digital camera 100. Immediately after the start-up of the digital camera 100, a superimposing manner of noise is different from that in normal time, so that there is a possibility that the error of the motion information detected by the detection unit 215 is large.

Another factor that affects the error of the motion information is the subject distance. When the system control unit 210 detects a motion vector between images with respect to a short-distance subject, a deviation between the motion vector and the motion information detected by the detection unit 215 may be large. This is because, while the detection unit 215 converts the angular velocity information obtained from a gyroscope into the motion information based on a referential subject distance, when the subject distance is small, a deviation between the subject distance and the referential subject distance is large.

The detection result of the motion information and the detection result of the motion vector as described above may be divided into each of X and Y directions by using a two-dimensional coordinate system (generally, an orthogonal coordinate system). The system control unit 210 may define that the X direction is a direction in parallel with a moving direction of the digital camera 100 and the Y direction is a direction perpendicular to the X direction. In other words, in each of the X direction and the Y direction, the digital camera 100 performs detection of the motion information and detection of the motion vector and further performs determination of the reliability of the motion information and selection of the motion vector. That is to say, each of the motion information and the motion vector obtained in step S509 and step S511 may be divided into a component in the X direction and a component in the Y direction, and a determination for selecting the motion vector may be performed in each direction. Hereinafter, details of step S512 and step S513 where the two-dimensional coordinate system is used will be described.

Figure 7:
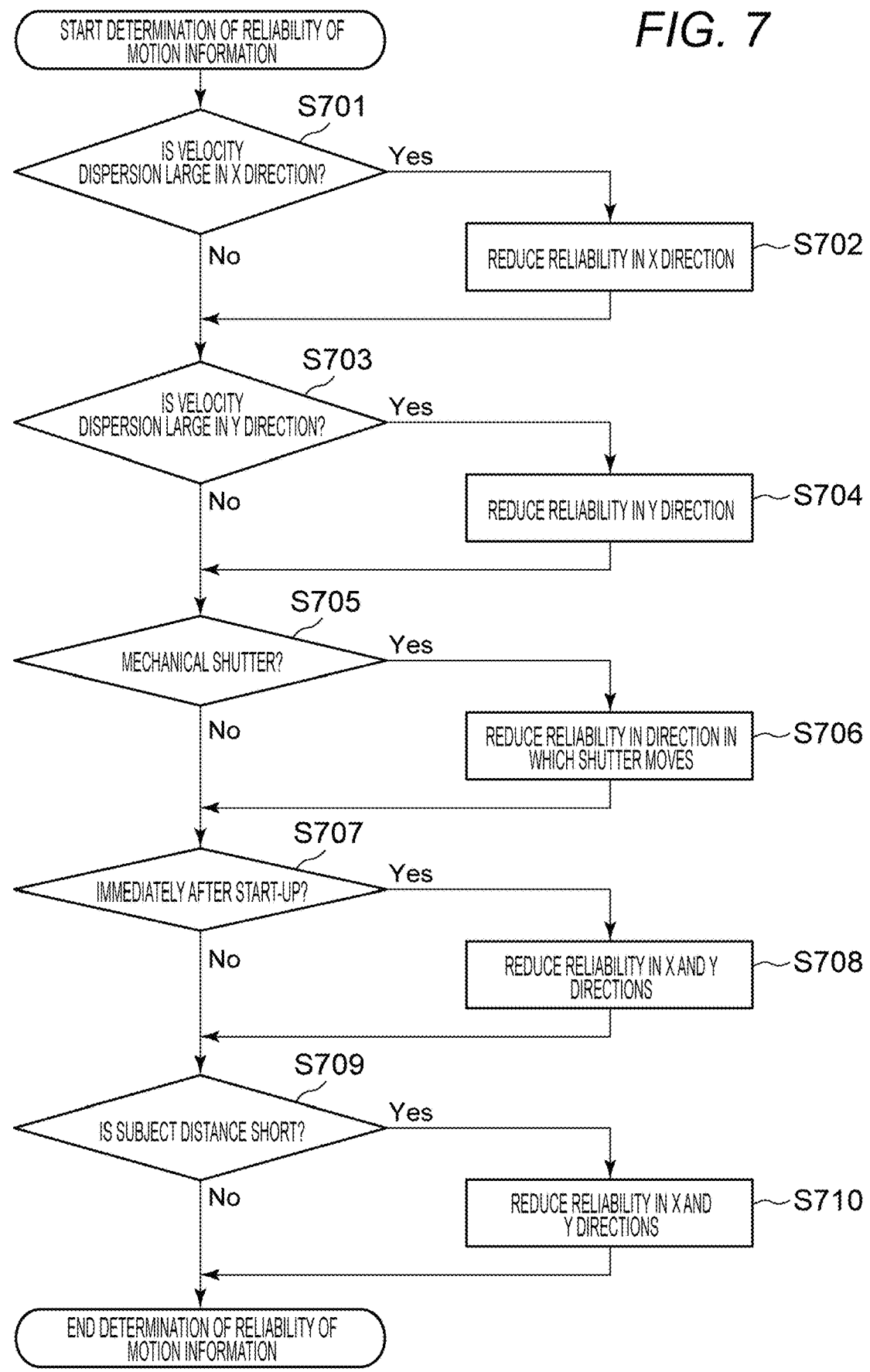
FIG. 7 is a diagram for explaining determination of reliability of the motion information in the embodiment of the present disclosure.

FIG. 7 is a diagram for explaining the determination of the reliability of the motion information in the present embodiment. As described above, in this flow, the determination will be described based on the two-dimensional coordinate system having X and Y directions.

In step S701, the system control unit 210 determines whether or not the dispersion of the velocity in the X direction detected by the detection unit 215 is greater than a predetermined value, and when the dispersion is greater than the predetermined value, the system control unit 210 proceeds to step S702, otherwise the system control unit 210 proceeds to step S703. In step S702, the system control unit 210 lowers the reliability of the motion information in the X direction according to the dispersion of the velocity in the X direction or lowers the reliability of the motion information in the X direction by a predetermined amount. The processing in step S703 and step S704 is processing where the X direction in step S701 and step S702 is replaced by the Y direction.

In step S705, the system control unit 210 determines whether or not the shutter 203 is a mechanical shutter. When the shutter 203 is a mechanical shutter, the system control unit 210 proceeds to step S706 and lowers the reliability in a direction in which the shutter 203 operates. For example, when the horizontal direction is defined as the X direction and the vertical direction is defined as the Y direction, it is often the case that the digital camera 100 is horizontally positioned and a direction in which the shutter 203 operates is the Y direction, so that the system control unit 210 lowers the reliability of the motion information in the Y direction. When a user holds the digital camera 100 diagonally, the direction in which the shutter 203 operates is not the vertical direction. Even in such a case, when the horizontal direction is defined as the X direction and the vertical direction is defined as the Y direction, the system control unit 210 lowers the reliability of the motion information in the X direction and the Y direction according to the posture information detected by the detection unit 215 in step S503.

On the other hand, when the shutter 203 is an electronical shutter, the shutter 203 does not perform a mechanical operation and does not apply vibration to the digital camera 100, so that the reliability of the motion information does not change.

In step S707, the system control unit 210 determines whether or not a predetermined time has elapsed since the digital camera 100 is started up, and when the predetermined time has not elapsed, the system control unit 210 proceeds to step S708, lowers the reliability of the motion information in the X direction and the Y direction, and proceeds to step S709. On the other hand, in step S707, when the system control unit 210 determines that it is not immediately after the start-up, the system control unit 210 directly proceeds to step S709.

In step S709, the system control unit 210 determines whether or not the subject distance is smaller than a predetermined value, and when the subject distance is smaller than the predetermined value, the system control unit 210 proceeds to step S710 and lowers the reliability of the motion information in the X direction and the Y direction. On the other hand, in step S709, when the system control unit 210 determines that the subject distance is not smaller than the predetermined value, the system control unit 210 completes the processing without lowering the reliability of the motion information.

Next, the determination of the reliability of the motion vector will be described in detail.

One factor that affects the reliability of the motion vector is a repetitive pattern in a captured image. Regarding an image having a repetitive pattern, a similar image is often captured when a digital camera is moved, so that an error of a detected motion vector is large even when the system control unit 210 uses any method of SAD, SSD, and NCC.

Figure 8A:
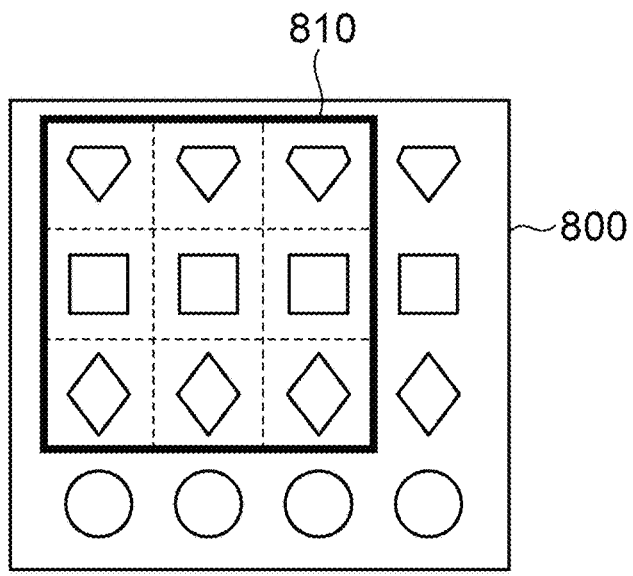
FIGS. 8A to 8C are diagrams for explaining a repetitive pattern in the embodiment of the present disclosure.
Figure 8B:
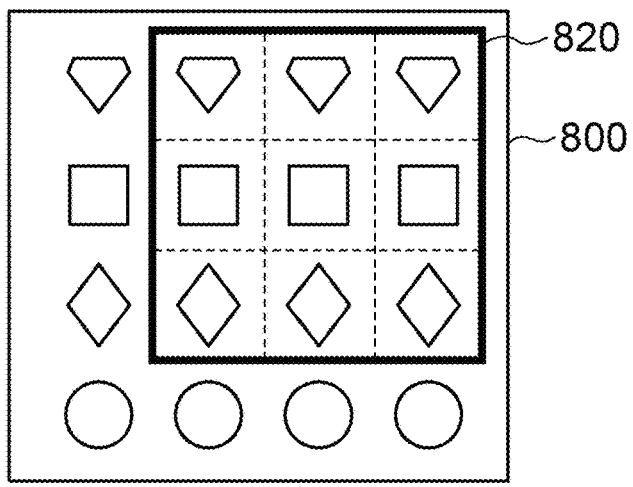
Figure 8C:
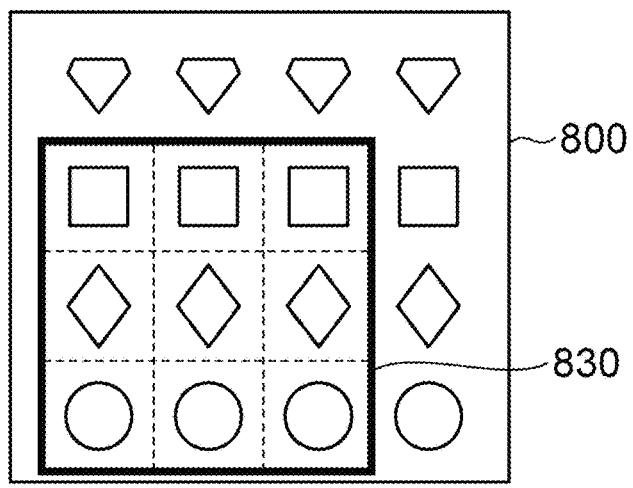

FIGS. 8A to 8C are diagrams for explaining a repetitive pattern in the present embodiment. FIGS. 8A to 8C show three images 810, 820, and 830 which the digital camera 100 captures with respect to a view angle 800 having similar subjects. In the view angle 800, similar subjects are repetitively arranged in a horizontal direction. The digital camera 100 first captures the image 810, moves in the horizontal direction to capture the image 820, and moves in a vertical direction from a position where the image 810 is captured to capture the image 830. The system control unit 210 detects a motion vector of each of the image 820 and the image 830 with respect to the image 810.

When comparing FIG. 8A and FIG. 8B, it is known that similar images are captured even though the digital camera 100 has moved. It is highly probable that the system control unit 210 determines that the digital camera 100 does not move at all while the digital camera 100 captures the images 810 and 820. Therefore, it is difficult for the system control unit 210 to obtain a correct motion vector even when comparing each block.

On the other hand, when comparing FIG. 8A and FIG. 8C, it is known that the image 830 has moved downward with respect to the image 810. When the system control unit 210 detects a motion vector by comparing the images 810 and 830, it is considered that the reliability is higher than that when comparing FIG. 8A and FIG. 8B.

As described above, when there is a repetitive pattern in an image, there is a possibility that the reliability of the motion vector is degraded. In particular, when there is a repetitive pattern in a specific direction, there is a possibility that the reliability of the motion vector in the specific direction is degraded.

When there is a line-shaped subject extending in one direction in an image in addition to a repetitive pattern, there is a possibility that the reliability of the motion vector in a direction along the line is degraded in the same manner as in the case of the repetitive pattern.

As another factor that degrades the reliability of the motion vector, there is an existence of a low contrast area. In any method of SAD, SSD, and NCC described above, the motion vector is often detected by using luminance, so that an error is easily generated in the low contrast area because a luminance difference between blocks is small in the low contrast area.

In step S513, the system control unit 210 determines the reliability of the motion vector by considering the factors as described above.

Figure 9:
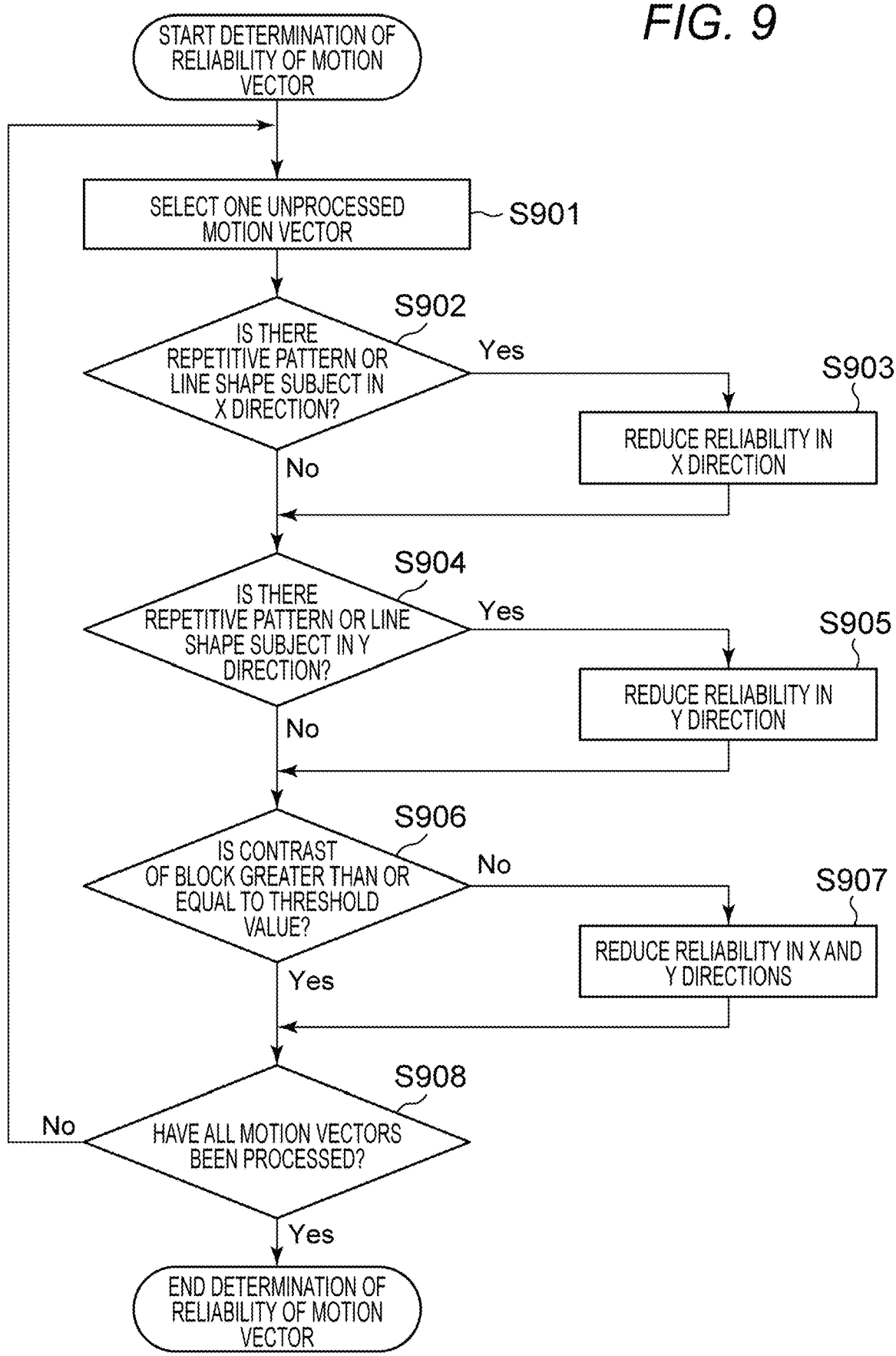
FIG. 9 is a flowchart for explaining determination of reliability of a motion vector in the embodiment of the present disclosure.

FIG. 9 is a flowchart for explaining an operation in which the system control unit 210 determines the reliability of the motion vector is step S513 in the present embodiment. In the following description, in the same manner as in FIG. 7, the system control unit 210 determines the reliability of the motion vector in each of the X direction and the Y direction.

In step S901, the system control unit 210 selects a motion vector, on which the reliability determination processing has not yet performed, as an object to be processed.

In step S902, when there is a repetitive pattern or a line-shaped subject in the X direction in a block in which a motion vector to be processed is detected, the system control unit 210 proceeds to step S903 and lowers the reliability in the X direction of the motion vector to be processed. In step S902, when there is not a repetitive pattern or a line-shaped subject in the X direction, the flow proceeds to step S904.

In step S904, when there is a repetitive pattern or a line-shaped subject in the Y direction in a block in which a motion vector to be processed is detected, the system control unit 210 proceeds to step S905 and lowers the reliability in the Y direction of the motion vector to be processed. In step S904, when there is not a repetitive pattern or a line-shaped subject in the Y direction, the flow proceeds to step S906.

In the determination of the line-shaped subject and the repetitive pattern described above, as an example, the system control unit 210 performs the determination through the SAD. When there is a line-shaped subject in an image, the amount of variation of SAD decreases extremely in a specific direction. The system control unit 210 determines the amount of variation of SAD on the entire image, and for example, when the amount of variation of SAD is small along the X direction, the system control unit 210 determines that there is a line-shaped subject in the X direction. The same goes for the Y direction. Further, when there is a repetitive pattern in an image, the system control unit 210 can detect a point where the SAD becomes minimum by obtaining a differential value of the SAD. When a plurality of points where the SAD becomes minimum are detected, the system control unit 210 determines that there is a repetitive pattern. When the system control unit 210 detects a plurality of points where the SAD becomes minimum in the X direction, the system control unit 210 determines that there is a repetitive pattern in the X direction. The same goes for the Y direction.

In step S904, the image processing unit 206 detects contrast in the block in which a motion vector to be processed is detected. The system control unit 210 compares the contrast detected by the image processing unit 206 with a predetermined threshold value, and when the contrast is smaller than the threshold value, the system control unit 210 proceeds to step S907 and degrades the reliability of the motion vector in the X direction and the Y direction. On the other hand, when the contrast is greater than or equal to the threshold value in step S906, the system control unit 210 directly proceeds to step S908.

In step S908, the system control unit 210 determines whether or not all the motion vectors have been processed. When the reliability determination processing has already been performed on all the motion vectors, this flow is completed, and when the reliability determination processing has not yet been performed on all the motion vectors, the system control unit 210 returns to step S901.

In the above description, the determination of the reliability of the motion information and the motion vector has been described.

<Correction of Motion Vector>

As described above, there is a possibility that the motion vector detected by the system control unit 210 in step S511 has an error, and thereby there is a possibility that an alignment accuracy of an image is degraded. Therefore, in step S514, the system control unit 210 performs correction on the motion vector. First, the system control unit 210 compares the reliability of the motion information with the reliability of each of the motion vectors and specifies a motion vector that is required to be corrected. Thereafter, the system control unit 210 performs correction on the vector that is required to be corrected by using the motion information. Hereinafter, an example the above will be described.

Figure 10:
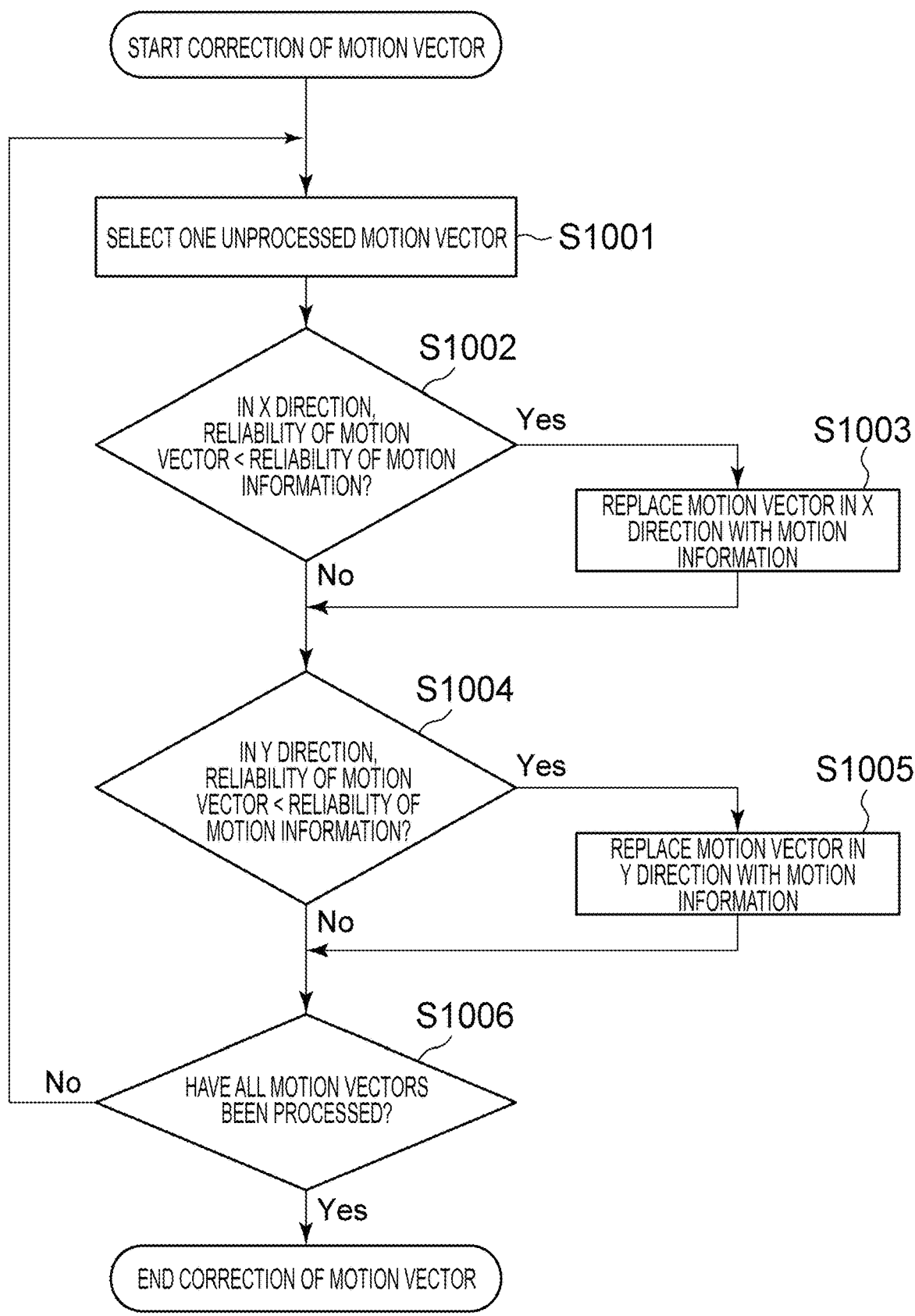
FIG. 10 is a flowchart for explaining correction of the motion vector in the embodiment of the present disclosure.

FIG. 10 is a flowchart for explaining the correction of the motion vector in step S514 in the present embodiment.

In step S1001, the system control unit 210 selects a motion vector, on which the correction processing of motion vector has not yet been performed, as an object to be processed.

In step S1002, the system control unit 210 compares the reliability of the motion vector and the reliability of the motion information in the X direction. When the reliability of the motion vector is lower than the reliability of the motion information, the system control unit 210 proceeds to step S1003 and replaces the motion vector in the X direction with a component in the X direction of the motion information. On the other hand, when the reliability of the motion vector is higher than or equal to the reliability of the motion information in step S1002, the system control unit 210 directly proceeds to step S1004.

In step S1004, the system control unit 210 compares the reliability of the motion vector and the reliability of the motion information in the Y direction. When the reliability of the motion vector is lower than the reliability of the motion information, the system control unit 210 proceeds to step S1005 and replaces the motion vector in the Y direction with a component in the Y direction of the motion information. On the other hand, when the reliability of the motion vector is higher than or equal to the reliability of the motion information in step S1004, the system control unit 210 directly proceeds to step S1006.

In step S1006, the system control unit 210 determines whether all the motion vectors have been processed. When all the motion vectors have been processed or not, this flow is completed, and when not all the motion vectors have been processed, the system control unit 210 returns to step S1001.

In the above description, when the reliability of the motion information is smaller than the reliability of the motion vector, no processing is performed on the motion vector. However, it is not limited to this, and various modifications are possible. For example, the system control unit 210 may correct the motion vector by referring to the motion information according to a magnitude relation between the reliability of the motion vector and the reliability of the motion information and perform alignment by using the corrected motion vector. Specifically, the system control unit 210 compares the reliability of the motion vector and the reliability of the motion information, and when the reliability of the motion vector is higher than the reliability of the motion information, the system control unit 210 uses the motion vector as is for the alignment. On the other hand, when the reliability of the motion information is higher than the reliability of the motion vector, the system control unit 210 does not use the motion vector as is for the alignment but performs correction on the motion information so that a difference from the motion vector becomes small. Then, the system control unit 210 uses the corrected motion information for the alignment.

FIGS. 11A to 11E are diagrams for explaining the correction of the motion vector in the present embodiment. FIGS. 11A to 11E show a correction of motion vectors detected in each block when performing alignment on images 1100 and 1101. In FIGS. 11A to 11E, the horizontal direction is defined as the X direction and the vertical direction is defined as the Y direction.

Figure 11A:
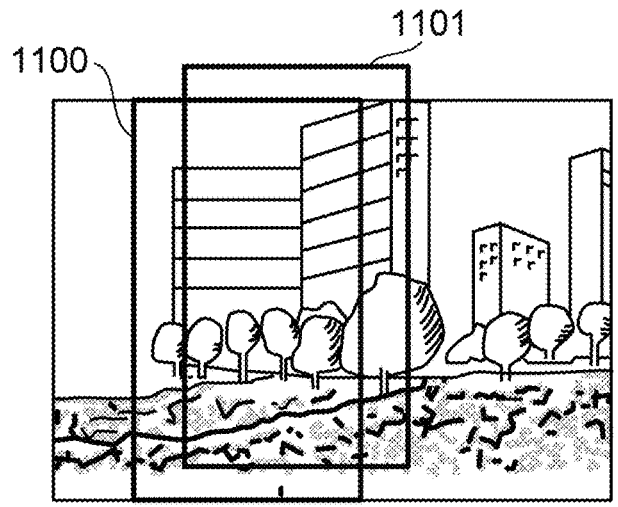
FIGS. 11A to 11E are diagrams for explaining the correction of the motion vector in the embodiment of the present disclosure.
Figure 11B:
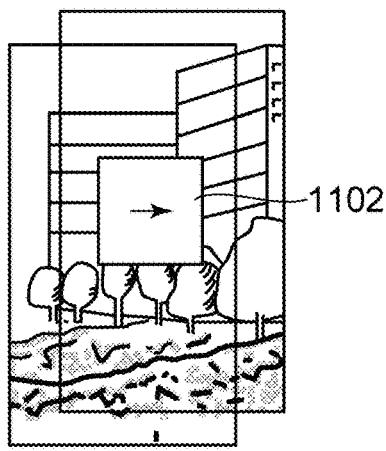

FIG. 11A shows the images 1100 and 1101 having an overlapped view angle. FIG. 11B shows a vector 1102 indicating motion information of the digital camera 100 obtained from the detection unit 215. When comparing the images 1100 and 1101, it is considered that the digital camera 100 moves to the upper right during image pickup. However, the vector indicating motion information does not have an upward component. This is assumed to be an effect of error.

Figure 11C:
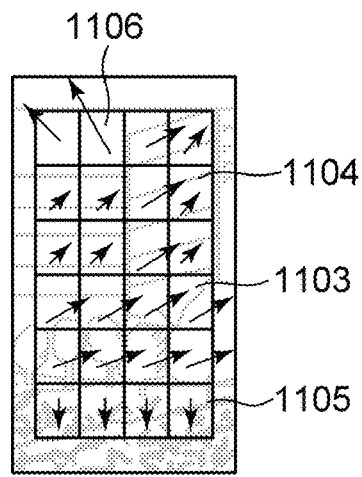

FIG. 11C shows a motion vector for each block detected by the system control unit 210 based on the SAD. A motion vector 1103 is not a target of correction because the reliability is high in both the X direction and the Y direction. In a block where a motion vector 1104 is located, a line-shaped subject is detected, so that the system control unit 210 determines that the reliability in the X direction is low. When the reliability in the X direction of the motion vector 1104 is lower than the reliability in the X direction of the motion information, the system control unit 210 replaces a component in the X direction of the motion vector 1104 by a component in the X direction of the vector 1102 based on the motion information.

In a block where a motion vector 1105 is located, the system control unit 210 detects a repetitive pattern (a grass field shown in the drawings) in both the X direction and the Y direction and determines that the reliability in the X direction and the Y direction of the motion vector 1105 is low. When the reliability of the motion vector 1105 is lower than the reliability of the motion information in the X direction and the Y direction, the system control unit 210 replaces components in the X direction and the Y direction of the motion vector 1105 with those of the vector 1102 indicating the motion information. (Substantially, the motion vector 1105 itself is replaced by the vector 1102 indicating the motion information.)

A block where a motion vector 1106 is located is a low contrast area, so that the reliability of the motion vector 1106 is low in the X direction and the Y direction. When the reliability of the motion vector 1106 is lower than the reliability of the motion information in the X direction and the Y direction, processing on the motion vector 1106 is the same as processing on the vector 1105.

Figure 11D:
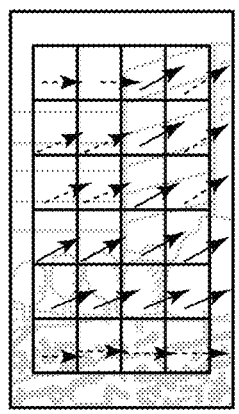

When the system control unit 210 performs the processing described above on all the motion vectors shown in FIG. 11C, corrected motion vectors as shown in FIG. 11D are obtained. In FIG. 11D, dashed line arrows represent motion vectors after replacement processing.

Finally, the system control unit 210 calculates a vector for calculating an alignment coefficient by using the corrected motion vectors shown in FIG. 11D. Here, it is assumed that the digital camera 100 only translationally moves while capturing the images 1100 and 1101, so that it is not necessary to perform an affine transformation or the like.

Figure 11E:
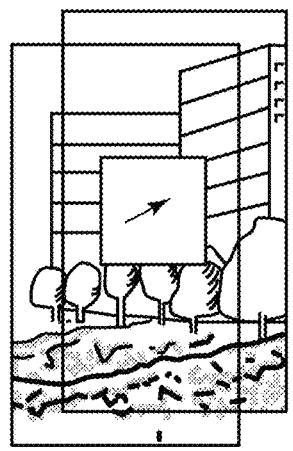

The system control unit 210 can calculate a vector shown in FIG. 11E by an average of the corrected motion vectors.

In the above description, either of the detected motion vector or the detected motion information is used for the alignment based on the magnitude relation of the reliability. However, a degree of correction for the motion vector may be adjusted according to the magnitude relation of the reliability.

In the embodiment described above, the system control unit 210 uses the motion vectors detected in all the blocks set in the image for the alignment. However, it can be considered that some motion vectors are not used for the alignment. For example, the system control unit 210 compares each motion vector with the motion information and does not correct motion vectors of which difference from the motion information is greater than a threshold value and does not use the motion vectors for the alignment. In other words, the system control unit 210 excludes some of the detected motion vectors from the motion vectors to be used to calculate the coefficient for aligning an image.

Figure 12A:
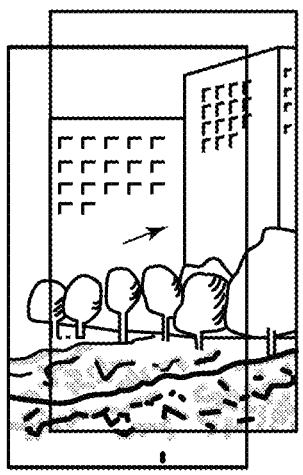
FIGS. 12A to 12C are diagrams for explaining exclusion of motion vectors in the embodiment of the present disclosure.
Figure 12B:
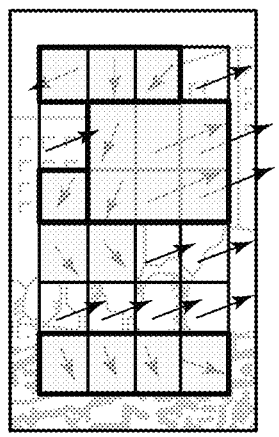
Figure 12C:
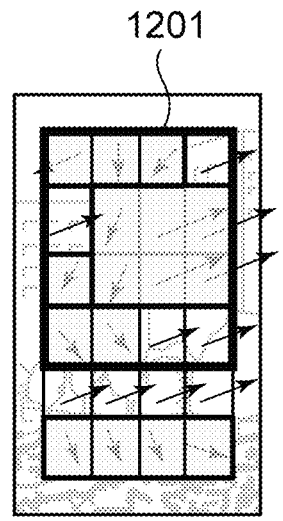

FIGS. 12A to 12C are diagrams for explaining exclusion of motion vectors in the present embodiment. FIG. 12A shows two images captured by the digital camera 100 while the digital camera is being moved and motion information detected by the detection unit 215. FIG. 12B shows a plurality of pieces of motion information detected by the system control unit 210. When FIG. 12B is immediately before the correction of the motion vector in step S514, the system control unit 210 obtains a difference between each motion vector and a vector indicating the motion information. Motion vectors where the difference is greater than a predetermined threshold value are not corrected by the system control unit 210 and are excluded. In FIG. 12B, the system control unit 210 determines that a difference between a motion vector detected from each gray block and the motion information is greater than the threshold value, and these motion vectors are not used for the alignment. The system control unit 210 may change the threshold value mentioned here by the reliability of the motion information. Specifically, when the reliability of the motion information is low, the system control unit 210 makes it difficult to exclude the motion vectors by increasing the threshold value to be compared with the difference between each motion vector and a vector indicating the motion information.

Further, FIG. 12C shows an area 1201 including a total of 16 (4×4) blocks. When the system control unit 210 determines to exclude blocks, the number of which is greater than a predetermined number, from the alignment in the area 1201, the system control unit 210 excludes all the blocks in the area 1201 from the alignment. When there is a moving body, a part of the moving body may be included not only in a block where a motion vector of which difference from the motion information is large is detected but also in blocks around the block. Therefore, it is possible to realize alignment with higher accuracy by also excluding the blocks around the block where a motion vector of which difference from the motion information is large is detected from the alignment.

Figure 13A:
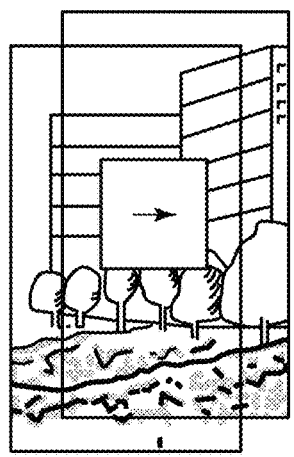
FIGS. 13A to 13C are diagrams for explaining alignment using a motion vector of an entire image in the embodiment of the present disclosure.
Figure 13B:
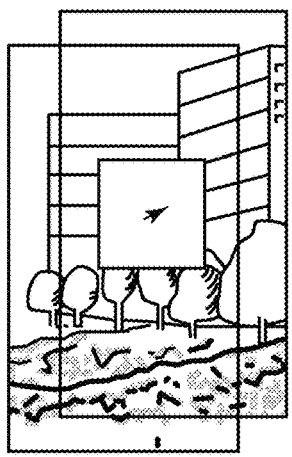
Figure 13C:
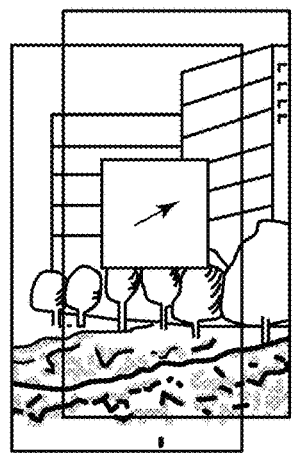

FIGS. 13A to 13C are diagrams for explaining alignment using a motion vector of an entire image in the present embodiment. FIG. 13A shows motion information of the digital camera 100 detected by the detection unit 215. The determination method of the reliability of the motion information is the same as that described above. FIG. 13B shows a motion vector of the entire image detected by the system control unit 210. Regarding a detection method of the motion vector of the entire image, first, in the same manner as FIG. 11C described above, the system control unit 210 divides the image into a plurality of blocks and detects a motion vector for each block. The system control unit 210 decides the motion vector of the entire image by an average of the plurality of motion vectors. Then, the system control unit 210 determines the reliability of the motion vector of the entire image. As the determination method, the system control unit 210 determines the reliability of the motion vector of each block by the determination method of step S513 described above, defines an average of the reliability as the reliability of the motion vector of the entire image, and compares the reliability of the motion vector of the entire image with the reliability of the motion information. Alternatively, the system control unit 210 compares the reliability of the motion vector of each block with the reliability of the motion information and statistically calculates a ratio of motion vectors having reliability higher than that of the motion information in each of the X direction and the Y direction. When the ratio of motion vectors having reliability higher than that of the motion information is higher than a predetermined threshold value, the system control unit 210 determines that the reliability of the motion vector of the entire image is higher than the reliability of the motion information. Finally, based on the result of the comparison of the reliability, when a correction is required for the motion vector of the entire image in each of the X direction and the Y direction, the system control unit 210 performs the correction and uses the corrected motion vector of the entire image to calculate an alignment coefficient. As an example, FIG. 13C shows a situation where the motion vector of the entire image in the X direction is replaced by a component in the X direction of a vector indicating the motion information.

In the above description of the embodiment, the system control unit 210 corrects the motion vector. However, the system control unit 210 may select some correction information when performing alignment of an image. For example, the system control unit 210 may compare the reliability of the motion information with the reliability of the motion vector and use higher reliability to calculate an alignment coefficient.

According to the present embodiment, it is possible to improve the accuracy of alignment of an image by performing correction on a motion vector used for the alignment of the image based on the motion information detected by the detection unit 215, the reliability of the motion information, and the reliability of the motion vector detected by the system control unit 210.

Other Embodiments

The above embodiment is described based on a personal digital camera. However, the embodiment can be applied to a mobile device, a smartphone, or a network camera connected to a server if they have a panoramic image pickup function and a synthetic function.

The present disclosure can also be realized by processing where a program that realizes one or more functions of the embodiment described above is supplied to a system or an apparatus through a network or a storage medium and one or more processors in the system or the apparatus read and execute the program. Further, the present disclosure can also be realized by a circuit (for example, ASIC) that realizes the one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-141305, filed Jul. 20, 2017, which is hereby incorporated by reference herein in its entirety.

What is claimed is:

1. An image processing apparatus, comprising:
at least one memory configured to store instructions; and
at least one processor in communication with the at least one memory and configured to execute the instructions to:
perform a first detection to detect motion information of an image sensor during a period in which the image sensor captures a first image and a second image based on an output of a sensor different from the image sensor,
perform a second detection to detect a plurality of motion vectors between the first image and the second image,
perform determination of first reliability of the motion information detected in the first detection and second reliability of the motion vectors detected in the second detection, and
perform alignment on the first image and the second image based on either one of the motion vectors or a vector indicated by the motion information, which has higher reliability, or a vector obtained from the motion vectors and the motion information according to the reliability,
wherein the sensor different from the image sensor is gyro or/and accelerator.

2. The image processing apparatus according to claim 1, wherein in the second detection, a plurality of areas are set in the first image, and the plurality of motion vectors are detected by using the plurality of areas.

3. The image processing apparatus according to claim 1, wherein the at least one processor executes further instruction to
perform a correction on at least a part of the plurality of motion vectors based on the motion information, the first reliability, and the second reliability, and
use the plurality of motion vectors, on which the correction is performed, for the alignment.

4. The image processing apparatus according to claim 1, wherein the at least one processor executes further instruction to, regarding the motion vectors having the second reliability lower than the first reliability,
replace the motion vectors with the vector indicated by the motion information and use the motion vectors that have been replaced for the alignment,
or
use the vector indicated by the motion information for the alignment without using the motion vectors for the alignment.

5. The image processing apparatus according to claim 1, wherein when dispersion of the motion information is a first value, the first reliability is lower than that when the dispersion of the motion information is a second value lower than the first value.

6. The image processing apparatus according to claim 1, wherein the first reliability within a predetermined time from when the at least one processor is started up is lower than that after the predetermined time or more from when the at least one processor is started up.

7. The image processing apparatus according to claim 1, wherein when a subject distance of the first image or the second image is smaller than a predetermined subject distance, the first reliability is lower than that when the subject distance is not smaller than the predetermined subject distance.

8. The image processing apparatus according to claim 1, wherein when a contrast of a predetermined area of the first image or the second image is lower than a predetermined threshold value, the second reliability is lower than that when the contrast is higher than or equal to the threshold value.

9. The image processing apparatus according to claim 8, wherein the at least one processor executes further instruction to detect the motion vectors by using the predetermined area in the second detection.

10. The image processing apparatus according to claim 1, wherein the at least one processor executes further instruction to
perform the determination in each of a first direction and a second direction perpendicular to the first direction, and
obtain a component of a vector of higher reliability selected from a component of the motion vectors and a component of the vector indicated by the motion information in each of the first direction and the second direction or a component of the vector obtained from the motion vectors and the motion information according to the reliability and perform the alignment based on a vector synthesized from the components of the vectors obtained in each of the first direction and the second direction.

11. The image processing apparatus according to claim 1, wherein the first direction is a direction in parallel with a moving direction of the image sensor during the period in which the image sensor captures the first image and the second image.

12. The image processing apparatus according to claim 10, wherein the first direction is a direction that is set in advance.

13. The image processing apparatus according to claim 10, wherein while the image sensor performs image pickup, when there is an operation of a mechanical shutter in the first direction or the second direction, the first reliability in the direction is lower than that when there is no operation of the mechanical shutter.

14. The image processing apparatus according to claim 10, wherein in the first image or the second image, it is determined that when a repetitive pattern in the first direction or a line-shaped subject along the first direction is detected, the second reliability in the first direction is lower than that when a repetitive pattern in the first direction and a line-shaped subject along the first direction are not detected, and when a repetitive pattern in the second direction or a line-shaped subject along the second direction is detected, the second reliability in the second direction is lower than that when a repetitive pattern in the second direction and a line-shaped subject along the second direction are not detected.

15. The image processing apparatus according to claim 1, wherein the at least one processor executes further instruction to
select the motion vectors of which difference from the motion information is smaller than a predetermined value and use the motion vectors for the alignment, and
determine the predetermined value by the first reliability and the predetermined value when the first reliability is a third value is set to be smaller than the predetermined value when the first reliability is a fourth value lower than the third value.

16. The image processing apparatus according to claim 15, wherein the at least one processor executes further instruction to prevent all the motion vectors located in an area corresponding to the first image and the second image from being used for the alignment when the number of the motion vectors in the area of which difference from the motion information is greater than a predetermined value is greater than a predetermined number set in advance.

17. An image pickup apparatus, comprising:
an image sensor;
at least one memory configured to store instructions; and
at least one processor in communication with the at least one memory and configured to execute the instructions to:
perform a first detection to detect motion information of the image sensor during a period in which the image sensor captures a first image and a second image based on an output of a sensor different from the image sensor,
perform a second detection to detect a plurality of motion vectors between the first image and the second image,
perform determination of first reliability of the motion information detected in the first detection and second reliability of the motion vectors detected in the second detection, and
perform alignment on the first image and the second image based on either one of the motion vectors or a vector indicated by the motion information, which has higher reliability, or a vector obtained from the motion vectors and the motion information according to the reliability,
wherein the sensor different from the image sensor is gyro or/and accelerator.

18. A control method for image processing apparatus, comprising:
a first detecting to detect motion information of an image sensor during a period in which the image sensor captures a first image and a second image based on an output of a sensor different from the image sensor,
a second detecting to detect a plurality of motion vectors between the first image and the second image,
performing determination of first reliability of the motion information detected in the first detecting and second reliability of the motion vectors detected in the second detecting, and
performing alignment on the first image and the second image based on either one of the motion vectors or a vector indicated by the motion information, which has higher reliability, or a vector obtained from the motion vectors and the motion information according to the reliability,
wherein the sensor different from the image sensor is gyro or/and accelerator.

19. A computer-readable storage medium storing instructions that cause a computer to execute a method, the method comprising:
performing a first detection to detect motion information of an image sensor during a period in which the image sensor captures a first image and a second image based on an output of a sensor different from the image sensor;
performing a second detection to detect a plurality of motion vectors between the first image and the second image;
performing determination of first reliability of the motion information detected in the first detection and second reliability of the motion vectors detected in the second detection; and
performing alignment on the first image and the second image based on either one of the motion vectors or a vector indicated by the motion information, which has higher reliability, or a vector obtained from the motion vectors and the motion information according to the reliability,
wherein the sensor different from the image sensor is gyro or/and accelerator.

* * * * *